United States Patent [19]

Harrington et al.

[11] Patent Number: 4,834,572
[45] Date of Patent: May 30, 1989

[54] MOUNTING CLAMP

[75] Inventors: Robert L. Harrington, Eden Prairie; Dennis F. Feldhake, Prior Lake; Bradley G. Ellingson, Bloomington; Bruce E. McClellan, Richfield, all of Minn.

[73] Assignee: Thermo King Corporation, Minneapolis, Minn.

[21] Appl. No.: 268,099

[22] Filed: Nov. 7, 1988

[51] Int. Cl.$^4$ .............................. F16B 2/00; B65J 1/22
[52] U.S. Cl. .................. 403/316; 403/406.1; 403/348; 403/323; 24/287; 410/82
[58] Field of Search ............... 403/348, 323, 405.1, 403/406.1, 252, 316, 317; 24/287; 410/82, 76, 77, 84; 248/500, 503; 220/23.4; 206/512, 511, 509

[56] References Cited

U.S. PATENT DOCUMENTS

| | | | |
|---|---|---|---|
| 3,894,493 | 7/1975 | Strecker | 24/287 |
| 3,989,294 | 11/1976 | Carr | 410/82 |
| 4,196,673 | 4/1980 | Looks | 24/287 |
| 4,212,251 | 7/1980 | DiMartino | 24/287 |
| 4,437,211 | 3/1984 | Dorpmund | 410/82 |
| 4,597,701 | 7/1986 | DeWitt | 410/84 |
| 4,648,764 | 3/1987 | Pavlick | 24/287 |

Primary Examiner—Randolph A. Reese
Assistant Examiner—Carol I. Bordas
Attorney, Agent, or Firm—D. R. Lackey

[57] ABSTRACT

A mounting clamp for mounting a power supply to the corner castings of a thermal freight container, having a locking mechanism which automatically locks the mounting clamp in selectable installation and locking positions. The locking mechanism includes a gravity biased release lever which is actuated when it is desired to change from one position to the other. When the release lever is actuated and a new operating position is reached, the release lever automatically locks the mounting clamp in the new position, without human intervention. The mounting clamp includes a base having first and second selectable positions for mounting the release lever, which positions respectively adapt the mounting clamp for right and left hand use.

7 Claims, 3 Drawing Sheets

MOUNTING CLAMP

BACKGROUND OF THE INVENTION

1. Field of the Invention

The invention relates in general to mounting clamps, and more specifically to mounting clamps for quickly mounting and removing power supplies from thermal freight containers.

2. Description of the Prior Art

Refrigerated containers, commonly called reefers, include an electric motor for driving the refrigerant compressor. When the reefer is aboard a ship, the ship's electrical system supplies the necessary electrical energy, and when the reefer is in a ship terminal, electrical energy is usually provided from power readily available at the terminal. When the reefer is in transit between a field location and a terminal, such as on board a trailer, the refrigeration system may include a Diesel engine for driving the compressor; or a temporary electrical power supply may be attached to the container, called a "gen set", which may include a Diesel engine driving an electrical generator. The present invention relates to reefers which require a temporary power supply to be attached thereto for auxiliary power to operate the refrigeration unit, when an electrical power source is not otherwise available.

Since a gen set is heavy and bulky, a fork lift is required to lift the gen set into position adjacent the front of a reefer. Thus, the attaching arrangement should be one which is easily maneuvered into the desired position. The attaching arrangement should be rugged and reliable, retaining the installation position without damage, notwithstanding accidental bumps which are common during installation. The attaching arrangement should be safe, retaining the mounting position until it is desired to remove the gen set from the reefer. Finally, since the gen set is not on the reefer very long, it should be quickly and easily attachable to, and detachable from a reefer, and all of the above desirable characteristics should be achieved by an arrangement which has a relatively low manufacturing cost.

SUMMARY OF THE INVENTION

Briefly, the present invention is a mounting clamp for mounting a gen set to the standard International Standards Organization (ISO) corner castings of a thermal freight container. Two mounting clamps are required for each gen set, one for each upper corner of the gen set frame, and the mounting clamp of the invention is easily adapted for right- or left-hand use. Each mounting clamp includes a shaft having a locking shoe on one end thereof, with the shaft being mounted on a base for rotation about its longitudinal axis. An operating handle is fixed to the shaft, and a release lever is pivotally fixed to the base. The release lever is gravity biased to a position which automatically locks the operating handle, shaft and locking shoe in one of two selectable positions. The operating handle is initially in a horizontal orientation which orients the locking shoe vertically for insertion into an elliptical opening in the front of a corner casting of a thermal freight container. When the locking shoe of each mounting clamp has been advanced into such an opening, the gravity biased release lever is manually tripped or actuated to a clear position which enables the operating handle, and thus the shaft and locking shoe, to be manually actuated to a clamping position in which the handle is oriented vertically downward and the locking shoe is horizontal, behind the front wall of a corner casting. As soon as the operating shaft reaches the clamping position, the gravity biased release lever automatically moves into a locking position, which locks the handle, shaft and locking shoe in the clamping position. To remove a gen set, the reverse procedure is followed, in which the release lever is manually actuated to enable the operating handle to be manually rotated to a horizontal orientation, the release lever automatically locks the operating handle in the removal position as soon as it is reached, and a fork lift can now move the gen set horizontally away from the front of the container.

BRIEF DESCRIPTION OF THE DRAWINGS

The invention may be better understood and further advantages and uses thereof more readily apparent when considered in view of the following detailed description of exemplary embodiments, taken with the accompanying drawings, in which.

DESCRIPTION OF PREFERRED EMBODIMENTS

Figure 1:
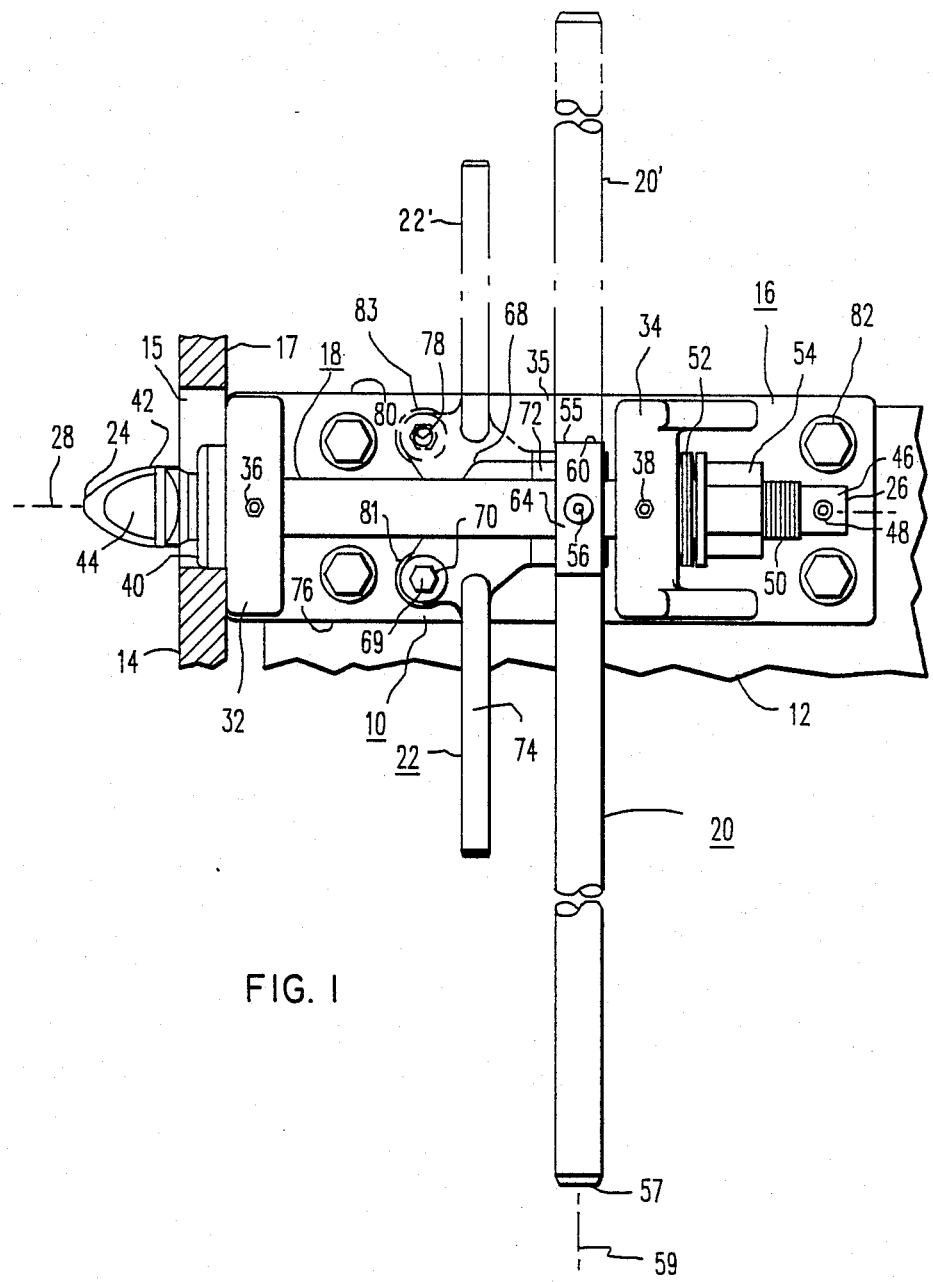
FIG. 1 is an elevational view of a mounting clamp constructed according to the teachings of the invention, shown in a clamping position.
Figure 2:
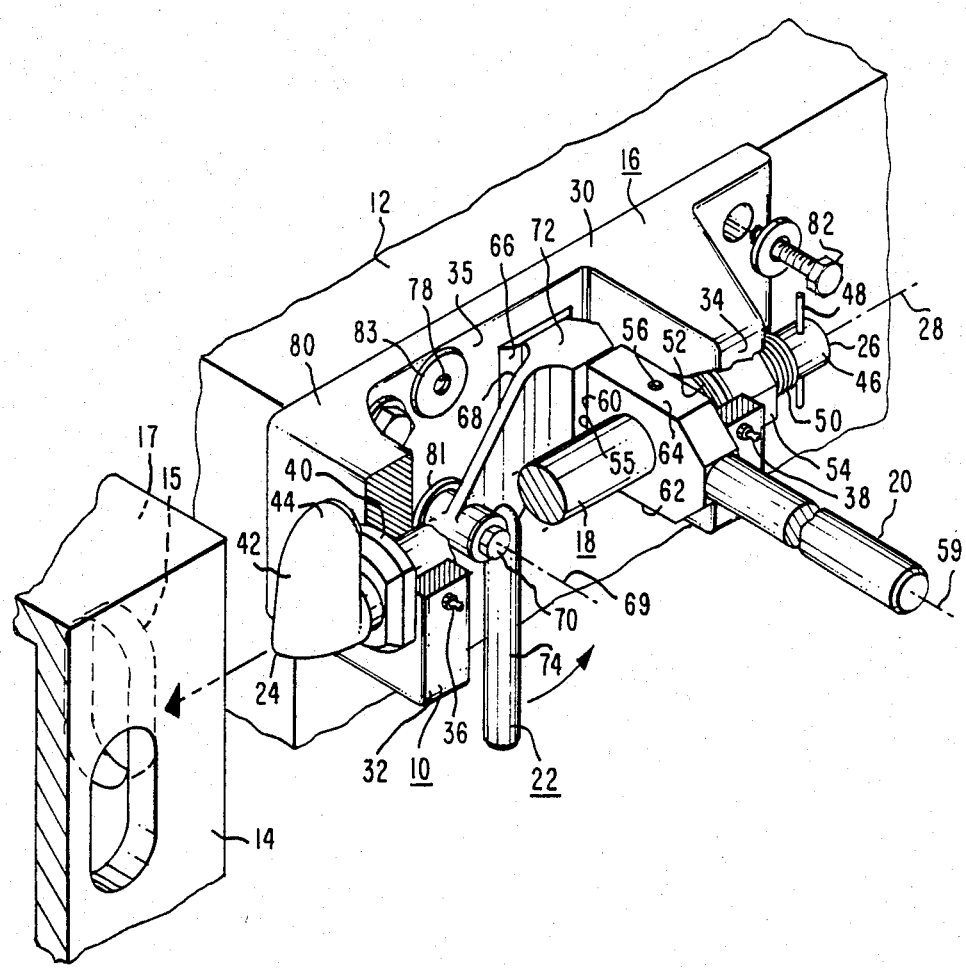
FIG. 2 is a perspective view of the mounting clamp shown in FIG. 1, showing an installation and removal position.
Figure 3:
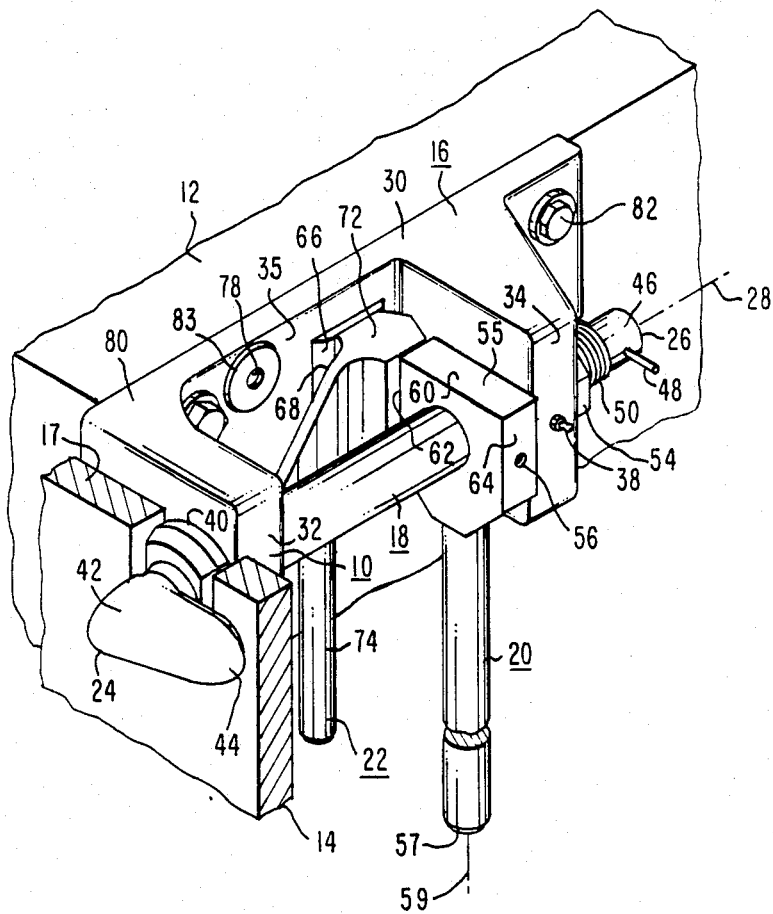
FIG. 3 is a perspective view of the mounting clamp shown in FIG. 1, similar to FIG. 2, except showing the clamping position of FIG. 1.

Referring now to the drawings, FIG. 1 is an elevational view of a mounting clamp 10 fixed to one side of the frame of a gen set 12, and clamped to a standard ISO corner casting 14 of a thermal freight container. A mounting clamp similar to mounting clamp 10, except modified for the opposite hand, is disposed at the opposite corner of gen set 12, which is clamped to another corner casting. Each corner casting 14 includes elliptical openings, such as opening 15 in a front wall 17, for cooperating with mouting clamp 10. The required modification of clamp 10 for the opposite hand, will be hereinafter described. FIGS. 2 and 3 will also be referred to during the following description, with FIGS. 2 and 3 being perspective views of clamp 10 in an installation or removal orientation, and in a clamping orientation, respectively.

Mounting clamp 10, the major parts of which are preferably machined from gray iron castings for ruggedness and strength, includes a base 16, a shaft 18, an operating handle 20, and a release lever 22. Shaft 18 has first and second ends 24 and 26, respectively, and a longitudinal axis 28 which extends between its ends. Shaft 18 is mounted for rotation on base 16. For example, base 16 may include a flat mounting portion 30 having first and second spaced wall portions 32 and 34, respectively, which extend outwardly from a common flat side 35 of base 16. Wall portions 32 and 34 may have openings sized to snugly receive shaft 18 with a clearance selected to allow shaft 18 to rotate within the openings. Grease fittings 36 and 38 and associated openings may be provided for lubricating the bearing interfaces between wall portions 36 and 38 and shaft 18. The shaft opening in wall portion 32 is surrounded by an integral projection 40 sized to extend into the elliptical opening 15 and support the weight of the gen set 12.

The first end 24 of shaft 18 includes a locking shoe 42 having an elongated nose portion 44 which extends outwardly for a predetermined dimension from axis 28. The predetermined dimension is selected to enable locking shoe 42 to fit through elliptical opening 15 in corner casting 14 when the nose 44 is oriented vertically upward, and to be behind the front wall 17 of corner casting 14, when nose 44 is oriented horizontally after the locking shoe 42 has been inserted through opening 15.

The second end 26 of shaft 18 includes a first portion 46 having a first diameter which extends inwardly from end 26, with the first portion 46 having an opening for receiving an observation indicator which indicates the orientation of the elongated locking shoe 42. For example, a roll pin 48 may be forced into a suitably dimensioned opening. When the locking shoe 42 is inserted into a corner casting 14, its orientation cannot be directly determined by sight, and the roll pin 48 may be conveniently observed to indicate whether or not the hidden locking shoe 42 is horizontal or vertical, i.e., in a clamping or removal orientation.

A second portion 50, having a secod diameter which is larger than the first diameter, extends inwardly from the first portion 46 for a predetermined dimension. The second portion 50 is threaded for a predetermined dimension, and then the second portion 50 continues until reaching the locking shoe 42.

Shaft 18 is inserted through the openings in wall portions 32 and 34, until locking shoe 42 contacts projection 40. Belleville springs 52 are disposed over the second end 26, and a nut 54 is threadedly engaged with the threaded diameter 50, before roll pin 48 is inserted, to securely hold shaft 18 in the desired position.

While shaft 18 is being assembled with base 16, i.e., inserted through openings in wall portions 32 and 34, the operating handle 20 is positioned on shaft 18, between wall portions 32 and 34. Operating handle 20, which has first and second ends 55 and 57, and a longitudinal axis 59 which extends between its ends, is fixed to shaft 18, such as by an Allen head screw 56 which extends through an opening in one side of handle 20, located near the first end 55, through an opening in shaft 18 which is oriented the same as the opening therein for the roll pin 48, and into a threaded opening on the opposite side of handle 20.

Operating handle 20, near its first end 55, includes a first flat surface 60, located at the terminus of shaft 18, i.e., the surface which defines the first end 55, and second and third flat surfaces 62 and 64, respectively. The second and third flat surfaces 62 and 64 are orthogonal to the first flat surface 60, forming right angled corners with the first surface 60. Each of the first, second and third flat surfaces 60, 62 and 64 are spaced from axis 28 by a like dimension, such that when operating handle 20 is rotated to place each flat surface adjacent to, and parallel with the facing surface 35 of base 16, the dimension between base 16 and each flat surface will be the same. The surface of base 16 which faces the flat surfaces formed near the first end 55 may be raised slightly, as indicated at 66.

Release lever 22 includes an elongated portion 68 having an opening at one end of the elongated portion which defines a pivot axis 69 for receiving a pivot pin 70 of the type which pivotally secures lever 22 to base 16, and a relatively wide heavy portion 72 at the other end of the elongated portion 68. An actuating handle 74 extends from the elongated portion 68, at a point relatively close to the end which includes pivot axis 69. The wide portion 72 is dimensioned to snugly but easily fit the dimension between raised portion 66 on base 16 and a flat surface 60, 62, or 64, when each flat surface is oriented parallel with raised portion 66. The heavy portion 72 is gravity biased against wall portion 34, tending to rotate release lever clockwise in the orientation of the release lever 22 shown in the Figures.

Base 16 is provided with first and second openings for receiving pivot pin 70, with the first opening being the one in which pivot pin 70 is associated with in the Figures, which is located near the lower lateral edge 76 of base 16. The second opening, referenced 78, is located near the opposite lateral edge 80. The first and second openings may be surrounded by projections 81 and 83, respectively, and the opening in release lever 22 for receiving the pivot pin 70 may be surrounded by a projection at both ends, to properly position the wide portion 72 of release lever 22. Pivotally fixing release lever 22 in the second opening 78 instead of in the first opening, is all that is necessary to adapt mounting clamp 10 for the opposite hand. Broken outline 22' illustrates the opposite hand position of release lever 22. Operating handle 20 will operate with either the right or left hand positions of release lever 22, with the first flat surface 60 being functional with both hands, the second flat surface 62 being fuctional with the hand illustrated in the figures, and with the third flat surface 64 being functional with the opposite hand. Broken outline 20' illustrates the locking position of operating handle 20 when release lever 22 is pivotally fixed in opening 78. To properly view the opposite hand, FIG. 1 should be rotated 180 degrees and the broken outline positions 20' and 22' of the operating handle and release lever used, instead of the solid line positions 20 and 22.

Mounting base 16 includes four openings for receiving mounting bolts, such as mounting bolt 82, which firmly secure mounting clamp 10 to gen set 12. Right- and left-hand configurations of mounting clamp 10 are fixed to opposite sides of the frame of the gen set 12.

In the operation of mounting clamp 10, if the locking shoe 42 is not already oriented upwardly, as shown in FIG. 2, which is the installation position, release lever 22 is actuated to move the heavy end 72 away from wall portion 34, to allow the operating handle 20 to be rotated to a horizontal position. As soon as flat surface 60 is parallel with surface 66 of base 16, the gravity operated release lever 22 will be automatically biased into the space between the two, positively locking the operating handle in the installation position. This is important, because the fork lift operator who is lifting a gen set into position cannot easily contend with an easily damaged clamp which could be jarred or bumped from the installation orientation. Once the locking shoes 42 of both the right and left hand clamps are advanced into the elliptical openings 15 in the corner castings 14, the release levers 22 are actuated to allow the operating handles 20 to be moved from the horizontal orientation of FIG. 2 to the vertical orientation of FIGS. 1 and 3, which rotates locking shoe 42 behind the front wall 17 of the corner casting 14, preventing the gen set 12 from being dislodged from the front of the associated reefer. As soon as the flat surface 62 (or 64 of the opposite hand) is adjacent to and parallel with surface 66 of base 16, the release lever 22 will be gravity biased into the locking position shown in the Figures. While handle 2 is being rotated between the installation and clamping orientations, a right angle corner of the operating handle 20 formed between two intersecting flat surfaces, will extend into the space normally occupied by end 72 of release lever 22, preventing end 72 from re-entering the space between the handle 20 and surface 66 of base 16 until a flat surface of the operating handle 20 is again adjacent to and parallel with surface 66.

In summary, mounting clamp 10 includes only four major easily assembled components, a base 16, a shaft 18, an operating handle 20 and a release lever 22, which contribute to provide a rugged, reliable mounting clamp assembly having a relatively low manufacturing cost. Mounting clamp 10 is easily operated between installation and clamping configurations, with each configuration being automatically locked as soon as it is reached, without human intervention.

We claim:

1. A mounting clamp suitable for mounting a power supply to a corner casting of a thermal freight container, comprising:
    a shaft having first and second ends, and a longitudinal axis which extends between its ends,
    a locking shoe on the first end of said shaft,
    a base,
    means mounting said shaft on said base for rotation about its axis,
    an operating handle having first and second ends, and a longitudinal axis extending between said ends,
    means fixing the first end of said operating handle to said shaft,
    and a release lever pivotally fixed to said base,
    said release lever being gravity biased to a position which automatically locks said operating handle, shaft, and shoe in a selected one of at least first and second operating positions,
    said release lever, when actuated against the gravity bias, enabling said operating handle, shaft and shoe to move to the other of the at least first and second operating positions, automatically locking said operating handle, shaft and shoe upon reaching said other operating position.

2. The mounting clamp of claim 1 including first and second selectable positions on said base for pivotally fixing the release lever, with the first and second positions respectively adapting the mounting clamp for right and left hand use.

3. The mounting clamp of claim 2 wherein the first end of the operating handle includes an opening for receiving the shaft, a first flat surface at the terminus of the shaft oriented perpendicular to the longitudinal axis of the operating handle, and second and third flat surfaces which form right angles with the first flat surface, said first, second and third flat surfaces each being parallel with and spaced from the base by the same dimension when the axis of the operating handle is in first, second and third orthogonally spaced positions, respectively, about the axis of the shaft, and the release lever has a thickness dimension selected to closely fit between the base and the first, second and third flat surfaces of the operating handle, when each flat surface is in adjacent spaced parallel relation with the base, with the first and second positions being used when the release handle is in the left-hand position, and the first and third positions being used when the release handle is in the right-hand position.

4. The mounting clamp of claim 1 wherein the first end of the operating handle includes an opening for receiving the shaft, a first flat surface at the terminus of the shaft oriented perpendicular to the longitudinal axis of the operating handle, and second and third flat surfaces which form right angles with the first flat surface, said first, second and third flat surfaces each being parallel with and spaced from the base by the same dimension when the axis of the operating handle is in first, second and third orthogonally spaced positions, respectively, about the axis of the shaft, and the release lever has a thickness dimension selected to closely fit between the base and the first, second and third flat surfaces of the operating handle, when each flat surface is in adjacent spaced parallel relation with the base.

5. The mounting clamp of claim 1 wherein the axis of the operating handle is horizontally oriented in the first operating position and vertically oriented in the second operating position.

6. The mounting clamp of claim 1 wherein the locking shoe is elongated, with the direction of elongation being vertical in the first operating position, and horizontal in the second operating position.

7. The mounting clip of claim 6 including an observation pin disposed through the shaft, with said observation pin having the same orientation as the orientation of the elongated locking shoe.

* * * * *